(No Model.)

T. F. VAN LUVEN.
CARRIAGE TOP JOINT.

No. 309,899. Patented Dec. 30, 1884.

Witnesses
R. P. King
C. G. Pennock

Inventor
T. F. Van Luven
By Henry Grist
Atty.

UNITED STATES PATENT OFFICE.

THOMAS F. VAN LUVEN, OF KINGSTON, ONTARIO, CANADA.

CARRIAGE-TOP JOINT.

SPECIFICATION forming part of Letters Patent No. 309,899, dated December 30, 1884.

Application filed September 25, 1884. (No model.)

*To all whom it may concern:*

Be it known that I, T. F. VAN LUVEN, of the city of Kingston, in the Province of Ontario, Canada, have invented certain new and useful Improvements in Carriage-Top Joints; and I do hereby declare that the following is a full, clear, and exact description of the same, reference being had to the annexed drawings, forming part of this specification, in which like letters of reference indicate corresponding parts in all the figures.

My invention has for its object to prevent the pivot parts composing the joints from becoming displaced after they have been secured to the carriage-top; and my invention consists in the combination of a socketed standard or arm having an annular recess on the outside to receive a prop or joint section sleeving thereon, a headed bolt passing into the socket of the standard or arm to retain the sleeve on the standard, and a pin passing through the prop or joint section into the socket of the arm and retaining-bolt, whereby the head of the pin, by the rocking of the joint, will underlie the prop or joint section when the parts are in position for the operation of the carriage-top.

Figure 4:
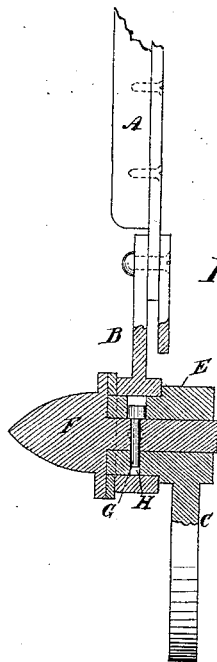
Figure 1:
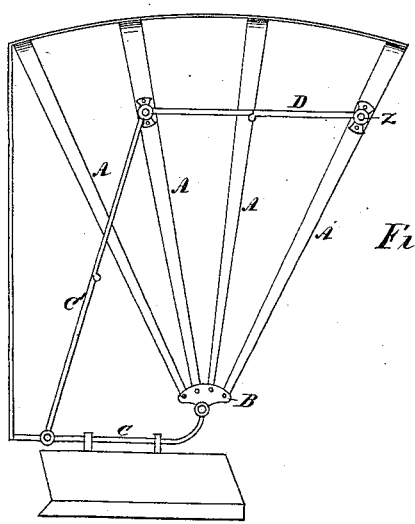
Figure 3:
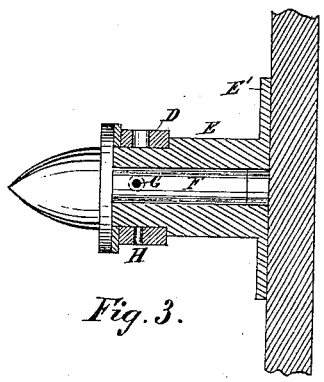
Figure 2:
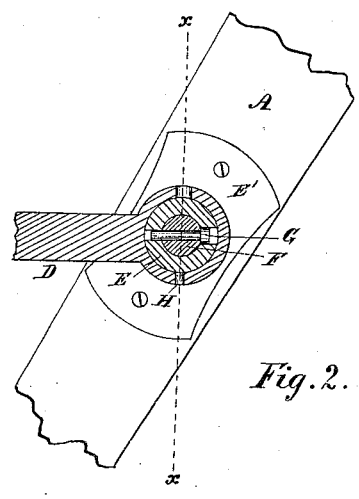

Figure 1 is an elevation of a carriage-top. Fig. 2 is an enlarged sectional elevation of one of the upper pivots, z, Fig. 1, embodying my invention. Fig. 3 is a transverse section on line x x, Fig. 2; and Fig. 4 is a sectional elevation of my improved pivot applied to the bow-irons and side rails.

A are the bows of a carriage-top; B, the bow-iron; C, the shifting-rails; C', the prop, and D the extension-brace, all operating for the usual purpose and in the ordinary manner.

The hinge or joint applied to the prop and brace consists of a socket standard or post, E, provided with a base, E', to be secured to the bows of the carriage-top by screws or other suitable fastenings. The standard-post has an annular recess at the top, on which to sleeve the end of the prop C' or brace D.

F is a headed bolt, passing into the socket of post E, and is confined therein by a pin, G, passing through a hole in the prop or brace and into coincident holes in the post E and bolt F, which holes are in alignment only when arbitrarily placed, so that when the post E is secured to the bows the hole in the prop or brace will be out of alignment with pin G, and thus prevent the pin falling out of position by the head of the pin underlying the sleeve of the prop or brace.

H is a hole in the prop or brace, smaller than the pin G, its purpose being merely to insert an instrument to push back pin G when the holes are in alignment, for disconnecting the parts, should such be required, after being detached from the bows.

The hinge or joint applied to the bow-iron is shown in Fig. 4, wherein the bow-iron B is provided with a sleeve to fit on the recessed end of post E, which is formed on the end of the side rails, the headed bolt F then passing into the socket of post E, and secured pivotally by a pin, G, as previously described, before the bows are secured to the bow-iron, that, when so secured, the pin G cannot be removed, the hole in the sleeve being out of alignment with the pin.

I claim as my invention—

The combination of a socket-post, E, having an annular recess at the top, a sleeved part fitting thereon, headed bolt F, fitting into post E, and pin G, passing through the sleeve into the post and bolt, to permit the sleeve to pivot on the post and keep the pin in position, as set forth.

THOMAS F. VAN LUVEN.

Witnesses:
 FRANCIS ELKINGTON,
  *Kingston,*
 JOHN MCKENZIE.